(12) United States Patent
Pesavento et al.

(10) Patent No.: US 7,788,434 B2
(45) Date of Patent: Aug. 31, 2010

(54) INTERRUPT CONTROLLER HANDLING INTERRUPTS WITH AND WITHOUT COALESCING

(75) Inventors: Rodney J. Pesavento, Chandler, AZ (US); Joseph W. Triece, Phoenix, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 153 days.

(21) Appl. No.: 11/928,212

(22) Filed: Oct. 30, 2007

(65) Prior Publication Data

US 2008/0147946 A1 Jun. 19, 2008

Related U.S. Application Data

(60) Provisional application No. 60/870,107, filed on Dec. 15, 2006.

(51) Int. Cl.
*G06F 13/24* (2006.01)
*G06F 13/26* (2006.01)

(52) U.S. Cl. ................ 710/262; 710/263; 710/264
(58) Field of Classification Search ............ 710/265
See application file for complete search history.

(56) References Cited

U.S. PATENT DOCUMENTS 5,708,817 A * 1/1998 Ng et al. ............... 710/266
5,905,913 A 5/1999 Garrett et al. ............ 395/869
6,115,779 A * 9/2000 Haubursin et al. ........ 710/262
6,189,066 B1 * 2/2001 Lowe et al. .............. 710/260
6,265,922 B1 * 7/2001 Kirsch .................... 327/199
7,478,186 B1 * 1/2009 Onufryk et al. .......... 710/263

FOREIGN PATENT DOCUMENTS

WO 00/36519 6/2000
WO 02/41153 5/2002

OTHER PUBLICATIONS

International Business Machines; "Method for Combinatoric Interrupt Coalescing"; IP.com; Apr. 8, 2004; available online at IP.com; all pages.*
Intersil; "82C59A CMOS Priority Interrupt Controller"; intersil; Mar. 1997; all pages.*
International Search Report and Written Opinion; PCT/US2007/087237; pp. 12, May 7, 2008.

* cited by examiner

*Primary Examiner*—Ryan M Stiglic
(74) *Attorney, Agent, or Firm*—King & Spalding L.L.P.

(57) ABSTRACT

An interrupt controller has an interrupt register unit receiving a plurality of interrupt source signals, an interrupt detector coupled to the interrupt register unit, a counter unit coupled to the interrupt detector, wherein on the first occurrence of an interrupt source signal the counter unit defines a time window during which the interrupt register stores further interrupt source signals, and an interrupt request unit coupled to the counter unit for generating an interrupt request signal.

18 Claims, 4 Drawing Sheets

INTERRUPT CONTROLLER HANDLING INTERRUPTS WITH AND WITHOUT COALESCING

CROSS-REFERENCE TO RELATED APPLICATIONS

This application claims the benefit of U.S. Provisional Application No. 60/870,107 filed on Dec. 15, 2006, entitled "TEMPORAL PROXIMITY INTERRUPT COALESCING", which is incorporated herein in its entirety.

TECHNICAL FIELD

The present application relates to interrupt controllers.

BACKGROUND

Interrupt controllers are used in microprocessors and microcontrollers to manage a plurality of possible interrupt sources and so-called exception handling. Interrupts generally cause an exception in the sequential processing of a program and the execution of an interrupt service routine (ISR) witch allows the processor to react to the respective interrupt source. However, entering and exiting an ISR takes time. An ISR usually requires certain "house cleaning" procedures before and after execution which are sometimes called preamble and post-amble. Such preamble or post-amble of the ISR are not interruptible. Hence, frequent but low priority interrupts can consume significant processor time by entering and exiting their ISR code. However, certain steps can be skipped in the ISR if there are multiple pending interrupts that are handled sequentially. Some systems use concepts as tail-chaining and others use concepts such as coalescing. Tail-chaining is a generic activity that can be applied to any interrupt system at the controller and ISR level. Tail-chaining reduces over head by skipping the restoring and saving of core registers when chaining to another ISR. Tail Chaining recognizes a pending interrupt while in the post-amble of an ISR, allowing the current ISR to skip restoring some state registers and all pushed general purpose registers (GPR). Tail Chaining also allows the ISR for the pending interrupt to skip storing the GPR state. Furthermore, it reduces the back-to-back interrupt handling by at least 2*GPR saved.

Coalescing is a specific activity that is applied to an interrupt source to limit the number of interrupts generated. Coalescing is simply counting a specific number of requests before an actual interrupt is asserted to the processor. Thus, coalescing delays assertion of an Interrupt Event until there are two or more interrupts to service for one interrupt source.

SUMMARY

According to an embodiment, an interrupt controller may comprise an interrupt register unit receiving a plurality of interrupt source signals, an interrupt detector coupled to the interrupt register unit, a counter unit coupled to the interrupt detector, wherein on the first occurrence of an interrupt source signal the counter unit defines a time window during which the interrupt register stores further interrupt source signals, and an interrupt request unit coupled to the counter unit for generating an interrupt request signal.

According to a further embodiment, the counter unit may comprise a counter, a latency value register coupled to the counter, wherein the latency value register stores a latency value, a time-out unit coupled to the counter, wherein on the first occurrence of the interrupt source signal the counter is preloaded with the latency value and decremented by a clock signal and the comparator detects when the counter reaches zero. According to a further embodiment, the counter unit may comprise a counter, a comparator coupled to the counter, a latency value register coupled to the comparator, wherein the latency value register stores a latency value, wherein on the first occurrence of the interrupt source signal the counter is reset and incremented by a clock signal and the comparator detects when the counter reaches or exceeds the latency value. According to a further embodiment, the interrupt register may comprise a plurality of latches. According to a further embodiment, the interrupt register may comprise a register having a plurality of bits wherein each interrupt source signal is assigned to one of the plurality of bits. According to a further embodiment, the interrupt request unit further may receive an interrupt acknowledge signal and generates a reset signal for the interrupt register unit.

According to another embodiment, an interrupt controller may comprise a plurality of group interrupt controllers, each group interrupt controller comprising a group interrupt register unit receiving a plurality of interrupt source signals; an interrupt detector coupled to the interrupt register unit; a counter unit coupled to the interrupt detector, wherein on the first occurrence of an interrupt source signal the counter unit defines a time window during which the interrupt register stores further interrupt source signals; and a group interrupt request unit coupled to the counter unit for generating a group interrupt signal; a group interrupt arbiter receiving the group interrupt signals from the plurality of interrupt group controllers; and an interrupt request unit coupled to the group interrupt arbiter for generating an interrupt request signal.

According to yet another embodiment, an interrupt controller may comprise at least a first group interrupt controller generating an interrupt source signal for a plurality of interrupt sources; at least a second group interrupt controller, comprising: a group interrupt register unit receiving a plurality of interrupt source signals; an interrupt detector coupled to the interrupt register unit; a counter unit coupled to the interrupt detector, wherein on the first occurrence of an interrupt source signal the counter unit defines a time window during which the interrupt register stores further interrupt source signals; and a group interrupt request unit coupled to the counter unit for generating a group interrupt signal; a group interrupt arbiter receiving the interrupt source signal and the group interrupt signal from the first and second group interrupt controller; and an interrupt request unit coupled to the group interrupt arbiter for generating an interrupt request signal.

According to a further embodiment, the counter unit may comprise a counter, a latency value register coupled to the counter, wherein the latency value register stores a latency value; a time-out unit coupled to the counter; wherein on the first occurrence of the interrupt source signal the counter is preloaded with the latency value and decremented by a clock signal and the comparator detects when the counter reaches zero. According to a further embodiment, the counter unit may comprise a counter; a comparator coupled to the counter, a latency value register coupled to the comparator, wherein the latency value register stores a latency value; wherein on the first occurrence of the interrupt source signal the counter is reset and incremented by a clock signal and the comparator detects when the counter reaches or exceeds the latency value. According to a further embodiment, the interrupt register may comprise a plurality of latches. According to a further embodiment, the interrupt register may comprise a register having a plurality of bits wherein each interrupt source signal is assigned to one of the plurality of bits. According to a further embodiment, the interrupt request unit may further receive an interrupt acknowledge signal and may generate a reset signal for the interrupt register unit.

According to yet another embodiment, a method for handling a plurality of interrupts may comprise the steps of: receiving a first interrupt source signal from a plurality of interrupt source signals; storing the first interrupt source signal; defining a time window upon receipt of the first interrupt source signal; storing any further interrupt source signals occurring during the time window; and generating an interrupt request after expiration of the time window.

According to a further embodiment, the method may further comprise the step of servicing a plurality of interrupt source signals collected during the time window in a single service routine. According to a further embodiment, the method may further comprise the step of servicing a plurality of interrupt source signals collected during the time window using tail-chained interrupt service routines. According to a further embodiment, the time window may be created by a counter which on the first occurrence of an interrupt source signal is preloaded with a latency value and decremented by a clock signal until the counter reaches zero. According to a further embodiment, the time window may be created by a counter which on the first occurrence of an interrupt source signal is reset and incremented by a clock signal until the counter reaches a predetermined latency value.

According to yet another embodiment, a method for handling a plurality of interrupts may comprise the steps of assigning a plurality of sets of interrupt source signals to a plurality of interrupt groups; for each interrupt group, performing the steps of: receiving a first interrupt source signal; storing the first interrupt source signal; defining a time window upon receipt of the first interrupt source signal; storing any further interrupt source signals occurring during the time window; and generating a group interrupt signal after expiration of the time window; arbitrating any group interrupt signal from the plurality of interrupt groups; and generating an interrupt request.

According to a further embodiment, each group may be assigned a priority level. According to a further embodiment, the method may further comprise the step of servicing a plurality of interrupt source signals collected during the time window in a single service routine. According to a further embodiment, the method may further comprise the step of servicing a plurality of interrupt source signals collected during the time window using tail-chained interrupt service routines. According to a further embodiment, the time window may be created by a counter which on the first occurrence of an interrupt source signal is preloaded with a latency value and decremented by a clock signal until the counter reaches zero. According to a further embodiment, the time window may be created by a counter which on the first occurrence of an interrupt source signal is reset and incremented by a clock signal until the counter reaches a predetermined latency value.

BRIEF DESCRIPTION OF THE DRAWINGS

A more complete understanding of the present disclosure and advantages thereof may be acquired by referring to the following description taken in conjunction with the accompanying drawings wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Present microcontroller interrupt controllers respond to events as if they are all immediately critical. E.g., such a controller asserts the interrupt request to the CPU when the event occurs. Therefore, such a controller immediately recognizes low priority, single events. As stated above, entering and exiting an ISR consumes instructions clocks for saving and restoring GP registers. Events are asynchronous with respect to the main program and have a limited possibility of occurring simultaneously or closely in time. Current interrupt controllers, thus, prevent the ability of a shared ISR to processes more than one interrupt at a time and even prevent the ability of an ISR to tail-chain. However, not all events are critical, because many are low priority. E.g., real time operating system (RTOS) response requirements are in the 100 microsecond range.

According to an embodiment, a Temporal Proximity Interrupt Coalescing uses interrupt proximity timers to allow a temporal window in which any group of interrupts will be held off until the maximum allowable latency has been reached. This provides an opportunity to coalesce a number of interrupt events to be queued up and processed using tail-chaining ISRs or a single ISR.

Figure 1:
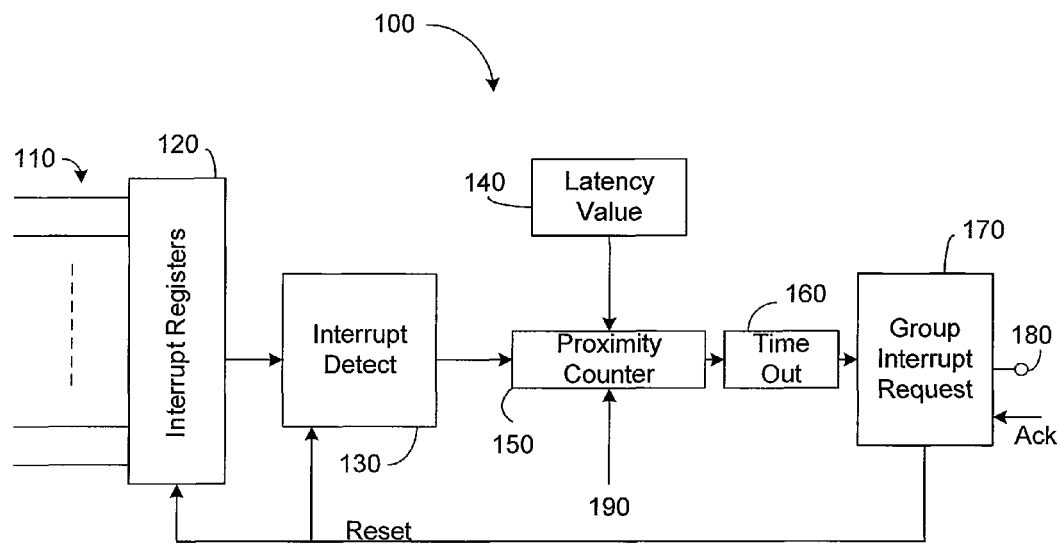
FIG. 1 is a schematic block diagram of a first embodiment of an interrupt controller.

FIG. 1 shows a first embodiment of an interrupt controller 100 capable of handling a plurality of interrupt sources. The plurality of interrupts are fed to the controller each by a single line as indicated by numeral 110 to associated interrupt register unit 120. According to an embodiment, these registers may be single one bit registers, such as a latch, switching their state when an interrupt occurs or can be implemented as a single register having a plurality of bits wherein each interrupt line 110 is assigned to one of the plurality of bits. An interrupt detect unit 130 detects any assertion of one or more interrupt signals and controls a proximity counter 150 which is coupled with a latency value register 140. Furthermore, proximity counter 150 is controlled by a clock signal 190 which controls a decrement function of the counter 150. The output of proximity timer 150 is coupled with a time out circuit 160 which compares the counter value and generates a signal whenever the counter reaches 0. This signal is then fed to an interrupt request unit 170 which generates a central processing unit (CPU) interrupt signal at terminal 180. According to one embodiment, the interrupt request unit 170 may comprise a mono-flop that generates a pulse as an interrupt request signal upon receiving a logic signal from the time out circuit 160. The interrupt controller 100 may further include circuitry that gathers and stores other necessary information, such as, priority, interrupt source address, timer information, etc., for handling the respective interrupt which can be provided or read by the CPU when executing the respective exception. Interrupt request unit 170 may further receive an interrupt acknowledge signal from the CPU and generate one or more reset signals RESET to reset interrupt register unit 120 and interrupt detect unit 130. The timing when to reset register unit 120 depends on the design of the interrupt handling by the CPU. Thus, register unit 120 may be reset through the interrupt service routine or through the interrupt acknowledge signal or any other appropriate event during the handling of the interrupt.

Figure 2:
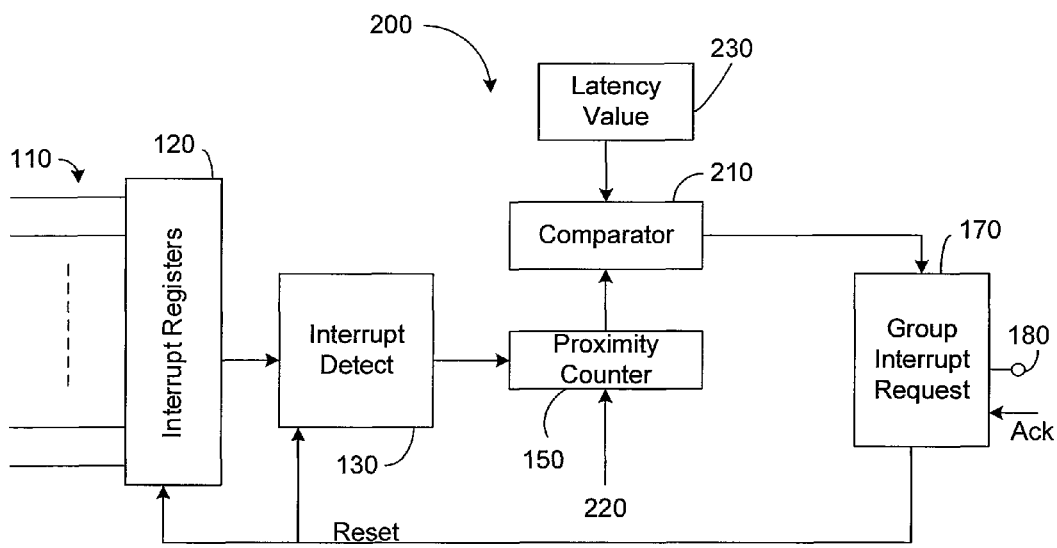
FIG. 2 is a schematic block diagram of a second embodiment of an interrupt controller.

FIG. 2 shows an another embodiment, in which counter 150 once started by interrupt detect unit 130 is controlled to perform an increment function by each clock signal 220. A comparator 210 compares the value of counter 150 with latency value register 230 and generates a signal fed to group interrupt request unit 170.

Figure 3:
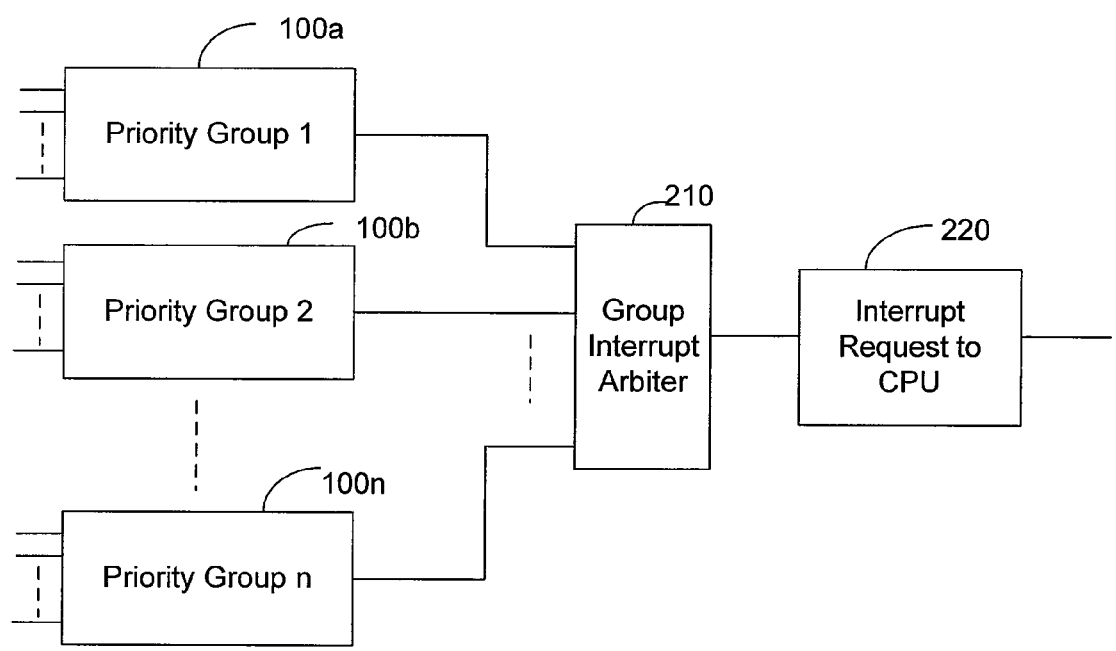
FIG. 3 is a third embodiment of an interrupt controller using multiple group controllers according to FIG. 1 or FIG. 2.

FIG. 3 shows a third embodiment of an interrupt controller using a plurality of interrupt group controllers 100 or 200 as shown in FIG. 1. Each group controller 100a . . . n can handle a plurality of interrupt sources, for example, 32 interrupt signals. Moreover, each group 100a . . . n can be assigned a specific priority level 1 . . . n. The output of each interrupt group controller 100a . . . n is fed to a group interrupt arbiter 210 which generates an output signal to an interrupt request unit 220 that provides for an CPU interrupt signal. The group interrupt arbiter 210 arbitrates the interrupt signal depending, for example, on the different priorities assigned to the different groups. However, any other type of arbitration can be used to generate a CPU interrupt signal.

According to an embodiment, the interrupt controller may assign any interrupt to one of the n priority groups 100a . . . n. Each priority group 100a . . . n can, for example, handle 32 interrupt sources. According to one embodiment, each group controller 100a . . . n can be designed as shown in FIG. 1. However, according to various embodiments, only the highest priority group controller 100a or any subset of the group controller 100a . . . n may be equipped with a proximity timer, whereas the remaining group controllers 100a . . . n are designed without the proximity counter 150 and generate an interrupt for that group whenever it occurs.

As shown in FIG. 3, even though only the lowest priority groups may need to have a proximity timer, in this example each priority group contains a latency value register 140, 230 and a proximity counter 150. Referring back to FIG. 1, a group's proximity counter 150 is loaded with the latency value from register 140 on the first occurrence of any interrupt mapped to the group through lines 110. The counter then decrements to zero based on the provided clock 190. Any other interrupts mapped to the group are captured by the interrupt registers 120 when they occur. According to FIG. 1, when the counter 150 reaches zero it sends an interrupt to the CPU. According to the embodiment shown in FIG. 3, when the counter 150 reaches zero it arbitrates with other groups 100a . . . n to be issued to the CPU interrupt input. The ISR can now process all interrupts that occurred during the latency period. Alternatively, as shown in FIG. 2, on the first occurrence of any interrupt mapped to the group through lines 110, the proximity counter 150 is reset and increments its value based on the provided clock 220. Comparator 210 continuously compares the counter value of counter 150 with the latency value of register 230 and if the counter is equal or exceeds the latency value generates the signal to group interrupt request unit 170.

Figure 4:
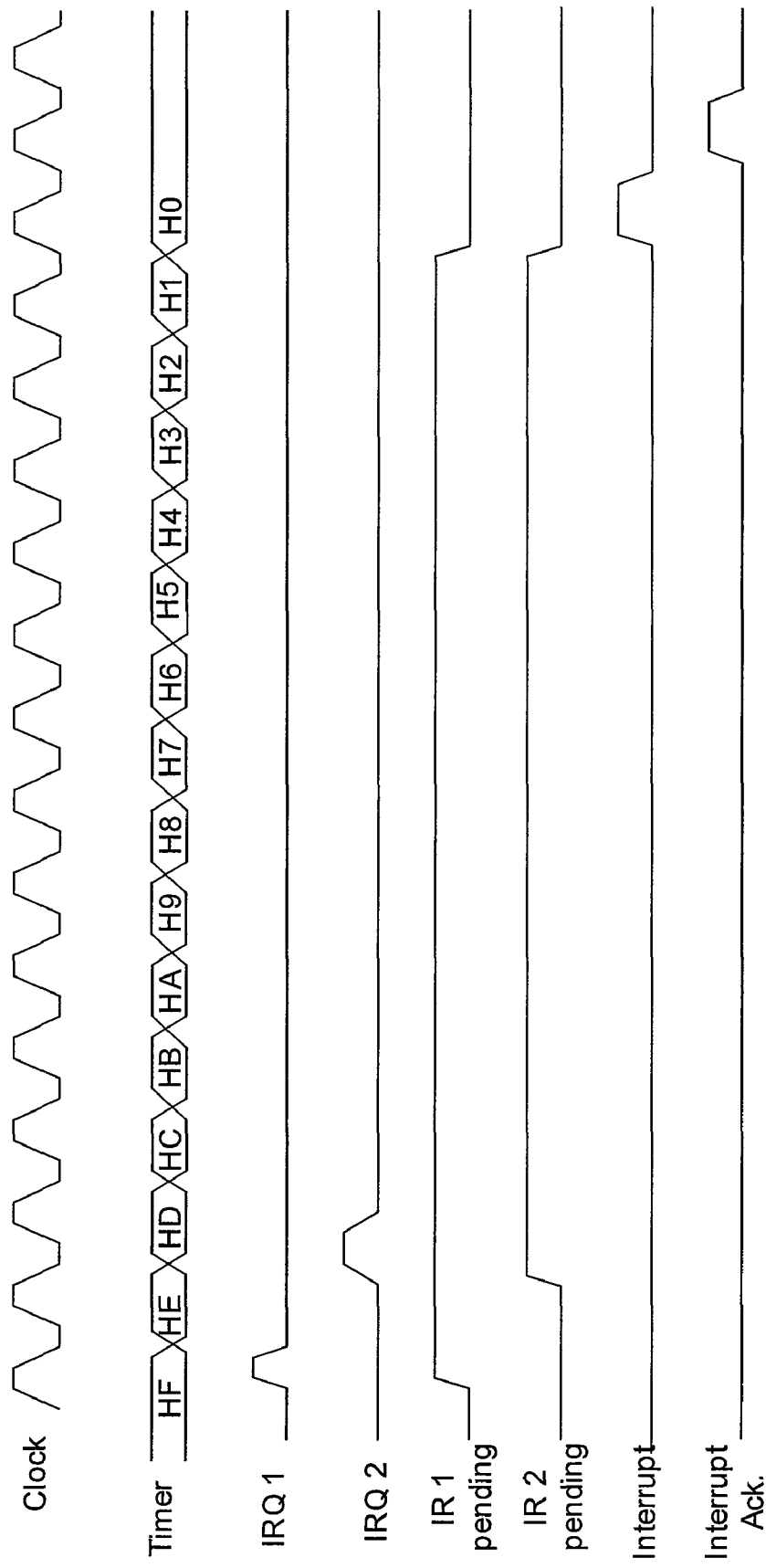
FIG. 4 is a timing diagram showing exemplary interrupt handling.

FIG. 4 shows a timing diagram of exemplary signal in a microcontroller or microprocessor system according to an embodiment. The top signal indicates the system clock. The next signal represents the timer 150 and its value according to the embodiment shown in FIG. 1. Signal IRQ 1 represents a first incoming interrupt assigned to a group which causes the register 120 to indicate that interrupt IRQ 1 has been asserted. Timing line "IRQ 1 pending" shows the time for which this interrupt is pending. IRQ 1 causes the timer 150 to load the preset value, in the example shown this value is 0xF (HF standing for "hexadecimal F"). With each clock, for example the rising edge of the clock signal, the timer is decremented until it reaches 0. This creates a time window. The system monitors other interrupt sources during this time window. As shown in the example of FIG. 4, a second interrupt IRQ 2 is asserted shortly after the first interrupt IRQ 1. This is also recognized by register 120. Again a timing line "IR 2 pending" shows the period for which this interrupt is pending. When the timer reaches 0, an interrupt is signaled to the CPU. The CPU acknowledges this interrupt and starts its service routine.

Figure 5:
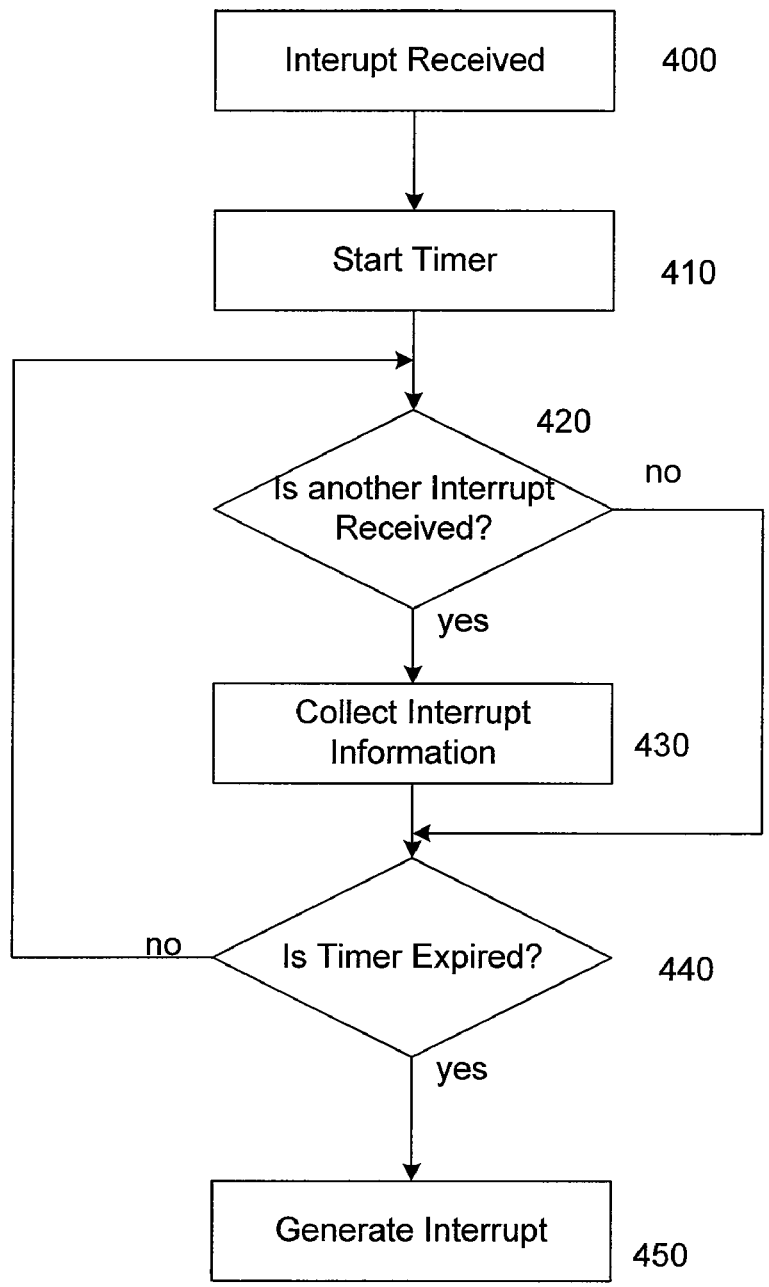
FIG. 5 is a flow chart of an interrupt handling according to an embodiment.

A respective flow chart is shown in FIG. 5. Whenever an interrupt is received at step 400, a timer is started in step 410. The timer is preset with a latency value and decremented to zero or rest and incremented to the latency value. The latency value can be assigned for each group according to respective minimum latency values. Thus, a plurality of groups can each be assigned with a different latency value. The latency value depends, thus, from the requirements how fast certain interrupts have to be serviced and, therefore can be individually assigned if a plurality of groups are used. Then it is determined whether another interrupt has been received in step 420, if yes, the respective interrupt information is collected and stored in step 430. If not, step 430 is skipped. In step 440 it is checked whether the timer has expired. If yes, an interrupt for the CPU is generated in step 450. Otherwise, steps 420 to 440 are repeated.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. An interrupt controller comprising:
   a first group interrupt controller to which first interrupt sources are assigned, comprising:
      a group interrupt register unit receiving a plurality of interrupt source signals from said first interrupt sources;
      an interrupt detector coupled to the group interrupt register unit;
      a counter unit coupled to the interrupt detector, wherein on the first occurrence of any received interrupt source signal the counter unit defines a time window during which the interrupt register stores further interrupt source signals; and
      a group interrupt request unit coupled to the counter unit for generating a group interrupt request signal;
   a second group interrupt controller to which second interrupt sources are assigned and generating a group interrupt signal without delay for any received interrupt source signal;
   a group interrupt arbiter receiving the group interrupt signals from the plurality of interrupt group controllers; and
   an interrupt request unit coupled to the group interrupt arbiter for generating an interrupt request signal.

2. The interrupt controller according to claim 1, wherein the counter unit comprises:

a counter,
a latency value register coupled to the counter, wherein the latency value register stores a latency value;
a time-out unit coupled to the counter;
wherein on the first occurrence of the interrupt source signal the counter is preloaded with the latency value and decremented by a clock signal and the comparator detects when the counter reaches zero.

3. The interrupt controller according to claim 1, wherein the counter unit comprises:
a counter;
a comparator coupled to the counter,
a latency value register coupled to the comparator, wherein the latency value register stores a latency value;
wherein on the first occurrence of the interrupt source signal the counter is reset and incremented by a clock signal and the comparator detects when the counter reaches or exceeds the latency value.

4. The interrupt controller according to claim 1, wherein the interrupt register comprises a plurality of latches.

5. The interrupt controller according to claim 1, wherein the interrupt register comprises a register having a plurality of bits wherein each interrupt source signal is assigned to one of the plurality of bits.

6. The interrupt controller according to claim 1, wherein the interrupt request unit further receives an interrupt acknowledge signal and generates a reset signal for the interrupt register unit.

7. An interrupt controller comprising:
at least a first group interrupt controller generating an interrupt source signal for any interrupt source assigned to the first group interrupt controller without coalescing interrupt signals;
at least a second group interrupt controller to which a plurality of interrupt sources is assigned, comprising:
a group interrupt register unit receiving interrupt source signals of said plurality of interrupt sources;
an interrupt detector coupled to the interrupt register unit;
a counter unit coupled to the interrupt detector, wherein on the first occurrence of any interrupt source signal assigned to said second group interrupt controller the counter unit defines a time window during which the interrupt register stores further interrupt source signals; and
a group interrupt request unit coupled to the counter unit for generating a group interrupt signal;
a group interrupt arbiter receiving the interrupt source signal and the group interrupt signal from the first and second group interrupt controller; and
an interrupt request unit coupled to the group interrupt arbiter for generating an interrupt request signal.

8. The interrupt controller according to claim 7, wherein the counter unit comprises:
a counter,
a latency value register coupled to the counter, wherein the latency value register stores a latency value;
a time-out unit coupled to the counter;
wherein on the first occurrence of the interrupt source signal the counter is preloaded with the latency value and decremented by a clock signal and the comparator detects when the counter reaches zero.

9. The interrupt controller according to claim 7, wherein the counter unit comprises:
a counter;
a comparator coupled to the counter,
a latency value register coupled to the comparator, wherein the latency value register stores a latency value;
wherein on the first occurrence of the interrupt source signal the counter is reset and incremented by a clock signal and the comparator detects when the counter reaches or exceeds the latency value.

10. The interrupt controller according to claim 7, wherein the interrupt register comprises a plurality of latches.

11. The interrupt controller according to claim 7, wherein the interrupt register comprises a register having a plurality of bits wherein each interrupt source signal is assigned to one of the plurality of bits.

12. The interrupt controller according to claim 7, wherein the interrupt request unit further receives an interrupt acknowledge signal and generates a reset signal for the interrupt register unit.

13. A method for handling a plurality of interrupts comprising the steps of:
assigning first interrupt source signals to a first interrupt group;
for the first interrupt group, performing the steps of:
receiving a first interrupt source signal;
storing the first interrupt source signal;
defining a time window upon receipt of any of the first interrupt source signal;
storing any further interrupt source signals occurring during the time window; and
generating a group interrupt signal after expiration of the time window;
assigning at least another interrupt source signal to a second interrupt group and generating an interrupt request on occurrence of said another interrupt source signal without delay;
arbitrating any group interrupt signal from the interrupt groups; and
generating an interrupt request.

14. The method according to claim 13, wherein each group is assigned a priority level.

15. The method according to claim 13, further comprising the step of servicing a plurality of interrupt source signals collected during the time window in a single service routine.

16. The method according to claim 13, further comprising the step of servicing a plurality of interrupt source signals collected during the time window using tail-chained interrupt service routines.

17. The method according to claim 13, wherein the time window is created by a counter which on the first occurrence of an interrupt source signal is preloaded with a latency value and decremented by a clock signal until the counter reaches zero.

18. The method according to claim 13, wherein the time window is created by a counter which on the first occurrence of an interrupt source signal is reset and incremented by a clock signal until the counter reaches a predetermined latency value.

* * * * *